(12) United States Patent
Yang et al.

(10) Patent No.: US 8,797,933 B2
(45) Date of Patent: Aug. 5, 2014

(54) APPARATUSES AND METHODS FOR SAVING POWER IN PAGING OPERATIONS

(75) Inventors: HongKui Yang, San Diego, CA (US); Jian Gu, Beijing (CN); Lijun Zhang, Beijing (CN)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 143 days.

(21) Appl. No.: 13/215,667

(22) Filed: Aug. 23, 2011

(65) Prior Publication Data
US 2012/0163259 A1 Jun. 28, 2012

(30) Foreign Application Priority Data

Dec. 27, 2010 (CN) .......................... 2010 1 0607349

(51) Int. Cl.
*H04W 68/00* (2009.01)
*H04W 52/02* (2009.01)

(52) U.S. Cl.
CPC ............ *H04W 52/0229* (2013.01); *Y02B 60/50* (2013.01); *H04W 68/00* (2013.01)
USPC ............ 370/311; 370/310; 370/312; 370/342

(58) Field of Classification Search
CPC .................... H04W 52/0229; H04W 52/0216; H04W 68/00; H04W 48/16; H04W 72/0446; H04B 1/707
USPC ......... 370/310–311, 375, 312, 342, 392, 389; 340/7.32–7.38; 455/574, 515, 455/343.1–343.6; 375/341–346
See application file for complete search history.

(56) References Cited

U.S. PATENT DOCUMENTS

| | | | | |
|---|---|---|---|---|
| 5,206,855 A | * | 4/1993 | Schwendeman et al. | 370/311 |
| 5,251,325 A | * | 10/1993 | Davis et al. | 340/7.38 |
| 5,410,734 A | * | 4/1995 | Choi et al. | 340/7.34 |
| 6,138,034 A | * | 10/2000 | Willey | 455/522 |
| 6,539,242 B1 | * | 3/2003 | Bayley | 455/574 |
| 6,870,890 B1 | * | 3/2005 | Yellin et al. | 375/340 |
| 7,519,106 B2 | * | 4/2009 | Sarkar et al. | 375/146 |
| 7,586,863 B2 | * | 9/2009 | Tu et al. | 370/311 |
| 8,023,475 B2 | * | 9/2011 | Goldberg et al. | 370/337 |
| 8,194,719 B2 | * | 6/2012 | Sarkar et al. | 375/146 |
| 2005/0030914 A1 | * | 2/2005 | Binzel et al. | 370/312 |
| 2007/0184866 A1 | * | 8/2007 | Kim et al. | 455/515 |
| 2007/0211688 A1 | * | 9/2007 | Park et al. | 370/347 |
| 2008/0130544 A1 | * | 6/2008 | Spencer et al. | 370/311 |
| 2008/0161022 A1 | * | 7/2008 | Patel et al. | 455/458 |
| 2009/0185519 A1 | * | 7/2009 | Kim et al. | 370/311 |
| 2009/0196209 A1 | * | 8/2009 | Haartsen | 370/311 |
| 2010/0173651 A1 | * | 7/2010 | Park et al. | 455/458 |
| 2013/0044662 A1 | * | 2/2013 | Kwon et al. | 370/311 |

* cited by examiner

*Primary Examiner* — Dang Ton
*Assistant Examiner* — Sai Aung
(74) *Attorney, Agent, or Firm* — McClure, Qualey & Rodack, LLP (57) ABSTRACT

A mobile communication device is provided with a wireless module and a controller module. The wireless module performs wireless transceiving to and from a service network. The controller module receives, on a paging channel, a first predetermined number of symbols in a frame of a time slot via the wireless module, and determines whether to enter a standby mode according to the first predetermined number of symbols. Also, the controller module stops the receiving of subsequent symbols in the frame by deactivating the wireless module in response to entering the standby mode.

15 Claims, 9 Drawing Sheets

APPARATUSES AND METHODS FOR SAVING POWER IN PAGING OPERATIONS

CROSS REFERENCE TO RELATED APPLICATIONS

This application claims priority of China Patent Application No. 201010607349.3, filed on Dec. 27, 2010, the entirety of which is incorporated by reference herein.

BACKGROUND OF THE INVENTION

1. Field of the Invention

The invention generally relates to the field of power saving technology, and more particularly, to save power by efficiently switching operation modes of mobile communication devices for paging operations.

2. Description of the Related Art

Figure 1:
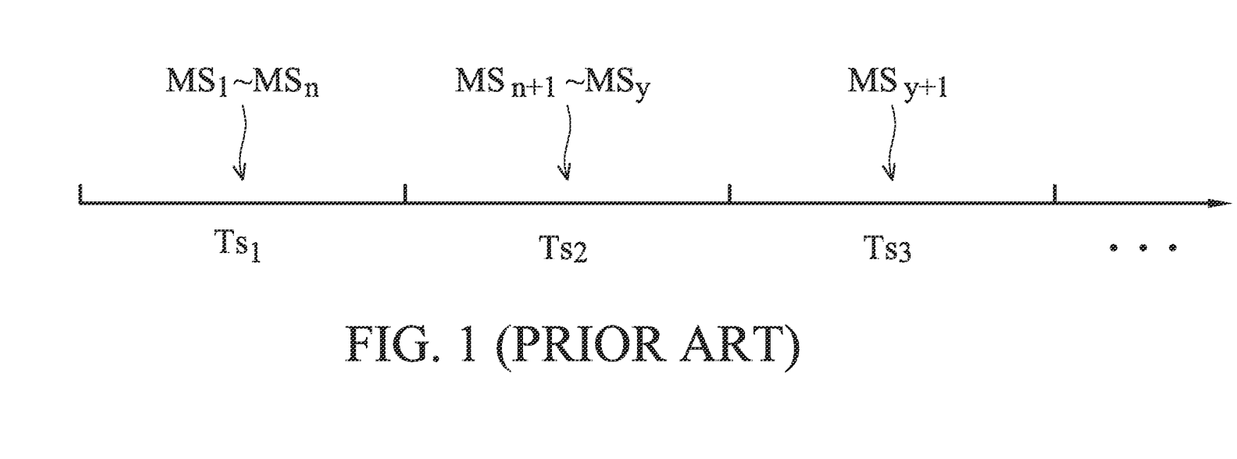
FIG. 1 is a block diagram illustrating the structure of frames and time slots on the paging channel.

In a typical mobile communication environment, a service network may transmit a paging message via the paging channel to inform a mobile station that wireless services, including voice and/or data services, are about to take place. Generally, the paging channel may be further divided into a plurality of time slots for unambiguously paging different mobile stations, i.e., each mobile station is assigned with a time slot on the paging channel. As shown in FIG. 1, the mobile stations $MS_1 \sim MS_n$ are assigned with the time slot $Ts_1$, the mobile stations $MS_{n+1} \sim MS_y$ are assigned with the time slot $Ts_2$, and so on. Particularly, the mapping relationships between the mobile stations and the time slots are in a predetermined cycle. According to the assignments, each mobile station has to monitor the assigned time slot for paging messages, and in order to save power, the mobile station may turn off the function of wireless transceiving and enter a standby mode (or so-called sleep mode) for the other time slots.

Figure 2:
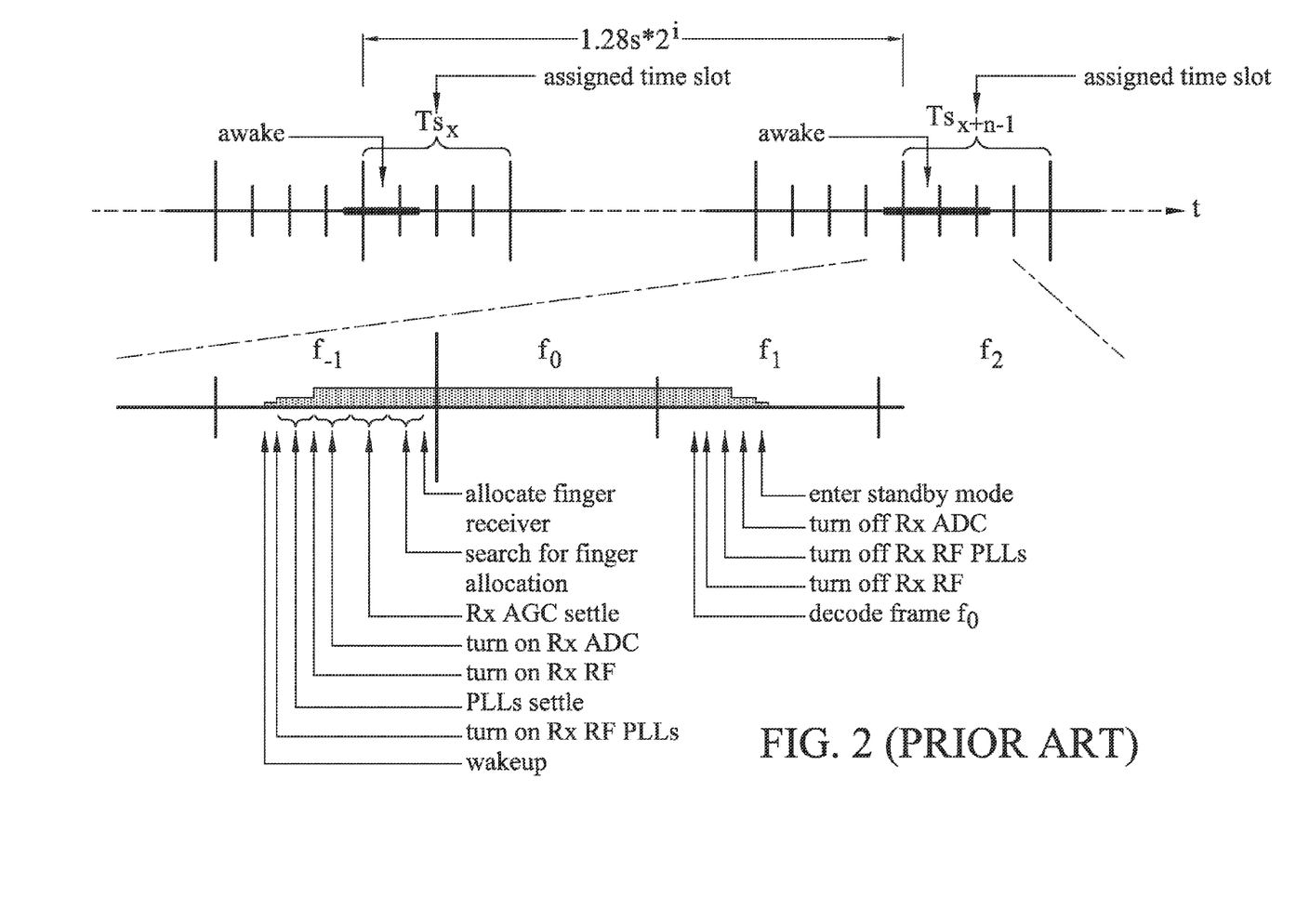
FIG. 2 is a timing chart illustrating a paging operation of a mobile station in the slotted mode.

Taking the Code division multiple Access 2000 (CDMA 2000) system for example, a mobile station operating in the slotted mode is assigned with a specific time slot for monitoring the paging channel, wherein each time slot is 80 milliseconds (ms) long and comprises 4 frames. Before the assigned time slot, the mobile station may enter the standby mode to save power, and later, leave the standby mode to receive a complete frame when in the assigned time slot. Subsequently, the mobile station may decode the received frame to obtain a paging message. It is noted that, the reception of the frame involves module operations, such as turning on the receiving (Rx) Radio Frequency (RF), Rx RF Phase-Locked Loops (PLLs), Rx Analog to Digital Converter (ADC), and digital baseband for more than 20 ms. According to the received frame, the mobile station may determine whether it is necessary to continue to monitor the paging channel. If not, the mobile station may turn off the modules for the Rx operations and enter the standby mode. FIG. 2 is a timing chart illustrating a paging operation of a mobile station in the slotted mode. As shown in FIG. 2, a mobile station is assigned with the time slots $Ts_x$ and $Ts_{x+n-1}$, i.e. the time slots on the paging channel are repeated at every n time slots. The mobile station wakes up (i.e., leaves the standby mode) before the assigned time slot, to turn on the modules for Rx operations, so that the Rx operations may be performed on time for the assigned time slot. To further clarify, in time slot $Ts_{x-1}$, the mobile station first turns on the Rx RF PLLs, and turns on the Rx RF and Rx ADC when the Rx RF PLLs is settled. Next, the mobile station searches for finger allocation when the Automatic Gain Control (AGC) of the Rx ADC is settled, and allocates finger(s) receiver before the time slot $Ts_x$ for receiving a paging message in the time slot $Ts_x$. After that, the mobile station demodulates the symbols received in the time slot $Ts_x$, and later, when a first frame is received after 20 ms, the mobile station decodes the first frame, and the second, until the message included in this slot is correctly received or until the last frame of the slot. The mobile station may determine whether it has been paged in the time slot according to the decoding result. If not, it means that it is unnecessary for the mobile station to monitor the paging channel in this time slot, so the mobile station turns off the Rx RF, Rx RF PLLs, and Rx ADC in sequence, and then enters the standby mode until the time slot prior to the next assigned time slot.

BRIEF SUMMARY OF THE INVENTION

Accordingly, embodiments of the invention provide apparatuses and methods for saving power in paging operations. In one aspect of the invention, a mobile communication device with a wireless module and a controller module is provided. The wireless module performs wireless transceiving to and from a service network. The controller module receives, on a paging channel, a first predetermined number of symbols in a frame of a time slot via the wireless module, and determines whether to enter a standby mode according to the first predetermined number of symbols. Also, the controller module stops the receiving of subsequent symbols in the frame by deactivating the wireless module in response to entering the standby mode.

In another aspect of the invention, a power saving method for paging operations in a mobile communication device is provided. The power saving method comprises the steps of receiving, on a paging channel, a first predetermined number of symbols in a frame of a time slot, determining whether to enter a standby mode according to the first predetermined number of symbols, and stopping the receiving of subsequent symbols in the frame by deactivating a wireless transceiving function in the mobile communication device, in response to entering the standby mode.

Other aspects and features of the present invention will become apparent to those with ordinarily skill in the art upon review of the following descriptions of specific embodiments of the apparatuses and methods for saving power in paging operations.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

The invention proposes a null General Paging Message (GPM) detection mechanism which enables a mobile station to use the null GPM to determine whether it is paged in a specific time slot earlier than the conventional design, so that power may be save since the mobile station may stop the receiving and decoding of symbols in less than the period of a time slot and enter the standby mode if it is not paged.

Figure 3:
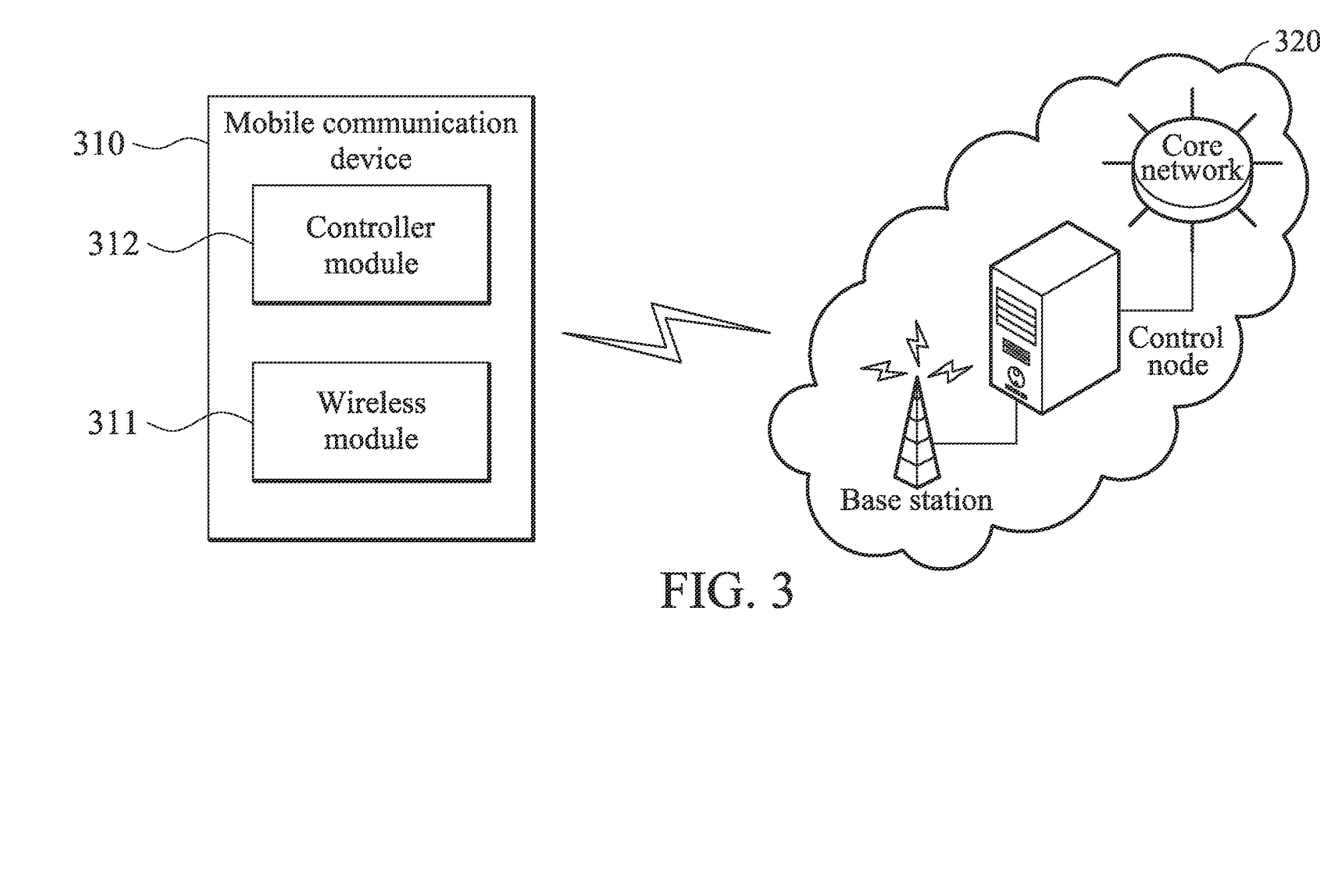
FIG. 3 is a block diagram illustrating a mobile communication environment according to an embodiment of the invention.

FIG. 3 is a block diagram illustrating a mobile communication environment according to an embodiment of the invention. In the mobile communication environment 300, the mobile communication device 310 is wirelessly connected to the service network 320 via the air interface for performing wireless transmission and receptions therebetween. The mobile communication device 310 comprises a wireless module 311 for performing the functionality of wireless transceiving. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in the Wideband Code Division Multiple Access (WCDMA) systems, or may be 450 MHz, 800 MHz, 1900 MHz, or 2100 MHz utilized in CDMA 2000 systems, or others depending on the radio access technology (RAT) in use. Also, the mobile communication device 310 comprises a controller module 312 for controlling the operation of the wireless module 311 and other functional components, such as a display unit and/or keypad serving as the MMI (man-machine interface), a storage unit storing the program codes of applications or communication protocols, or others. Particularly, the controller module 312 controls the wireless module 311 for performing the paging operations with the service network 320.

Figure 4A:
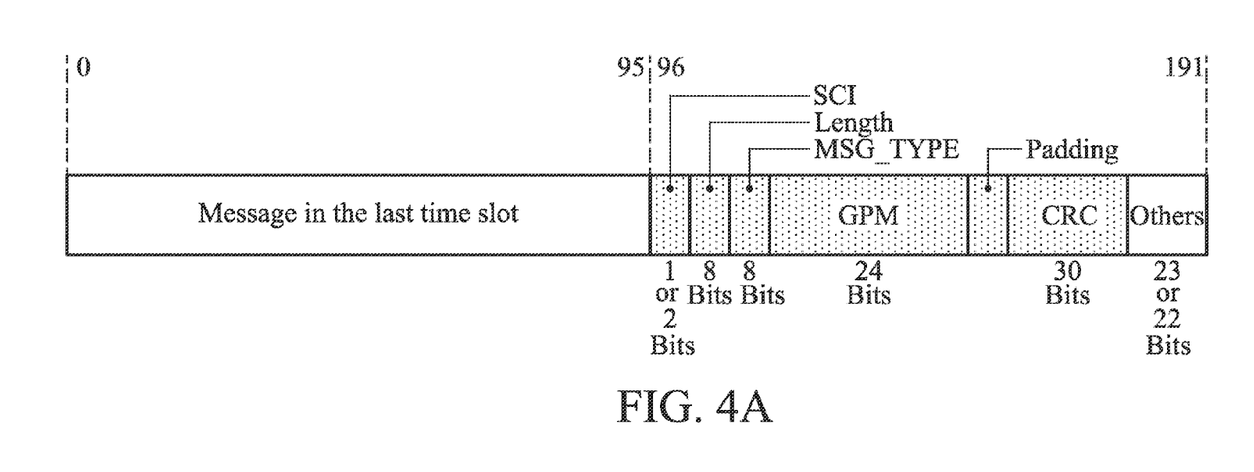
FIG. 4A is a block diagram illustrating the frame structure of the null GPMs transmitted in 9.6 Kbps.
Figure 4B:
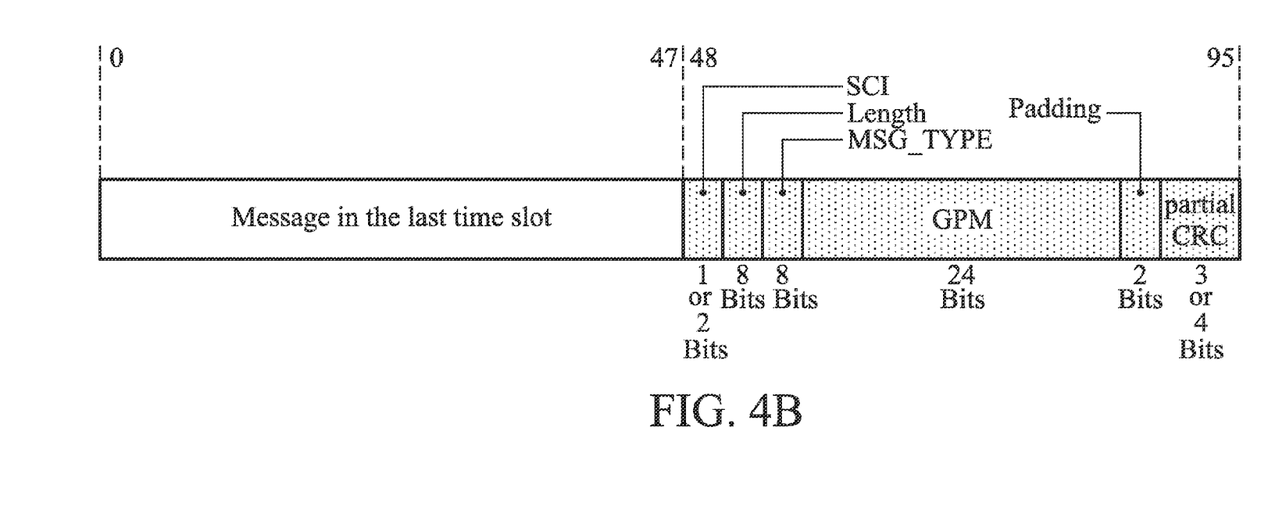
FIG. 4B is a block diagram illustrating the frame structure of the null GPMs transmitted in 4.8 Kbps.

Generally speaking, the operation status of the paging channel is not busy, especially during the evening periods. In this situation, the service network 320 may transmit a null GPM to the mobile communication device 310 in the first time slot of a frame, wherein the null GPM may be a GPM comprising no paging related information. FIGS. 4A and 4B are block diagrams illustrating the frame structures of the null GPMs transmitted in 9.6 Kbps and 4.8 Kbps, respectively. As shown in FIGS. 4A and 4B, the "SCI" fields comprise the Synchronized Capsule Indicators, which are 1 bit and 2 bits wild in the release 0 and release A of the CDMA 2000 systems, respectively. The "length" fields are 8 bits wild which indicate the length of the GPMs. The "MSG_TYPE" fields are 8 bits wild which indicate the types of the GPMs. The "padding" fields are 2 bits wild which are used for padding. The "CRC" fields are used to indicate the information of the Cyclic Redundancy Check which may be derived from the following equation:

$$g(x)=x^{30}+x^{29}+x^{21}+x^{20}+x^{15}+x^{13}+x^{12}+x^{11}+x^{8}+x^{7}+x^{6}+x^{2}+x+1$$

Regarding the detailed descriptions of the fields in a GPM, references may be made to the Media Access Control (MAC) Layer specification C.S0003 defined by the 3rd Generation Partnership Project 2 (3GPP2).

According to the Physical Layer specification C.S0002 defined by the 3GPP2, a 1/2 convolutional coding rate and a block interleaver are used for the paging channel. For a mobile station receiving a null GPM at a rate of 9.6 Kbps. If SCI is 1 bit, the first frame in each time slot comprises 130 ((73-8)*2) symbols which are known before the null GPM is received, as denoted with gray-colored ground in FIG. 4A. For a mobile station receiving a null GPM at a rate of 4.8 Kbps, the first frame in each time slot comprises 192 (48*4) symbols which are known before the null GPM is received, as denoted with gray-colored ground in FIG. 4B. The frame structures shown in FIGS. 4A and 4B are merely embodiments of the invention, and it is to be understood that modifications of the embodiments may be contemplated without departing from the spirit of the invention.

Figure 5:
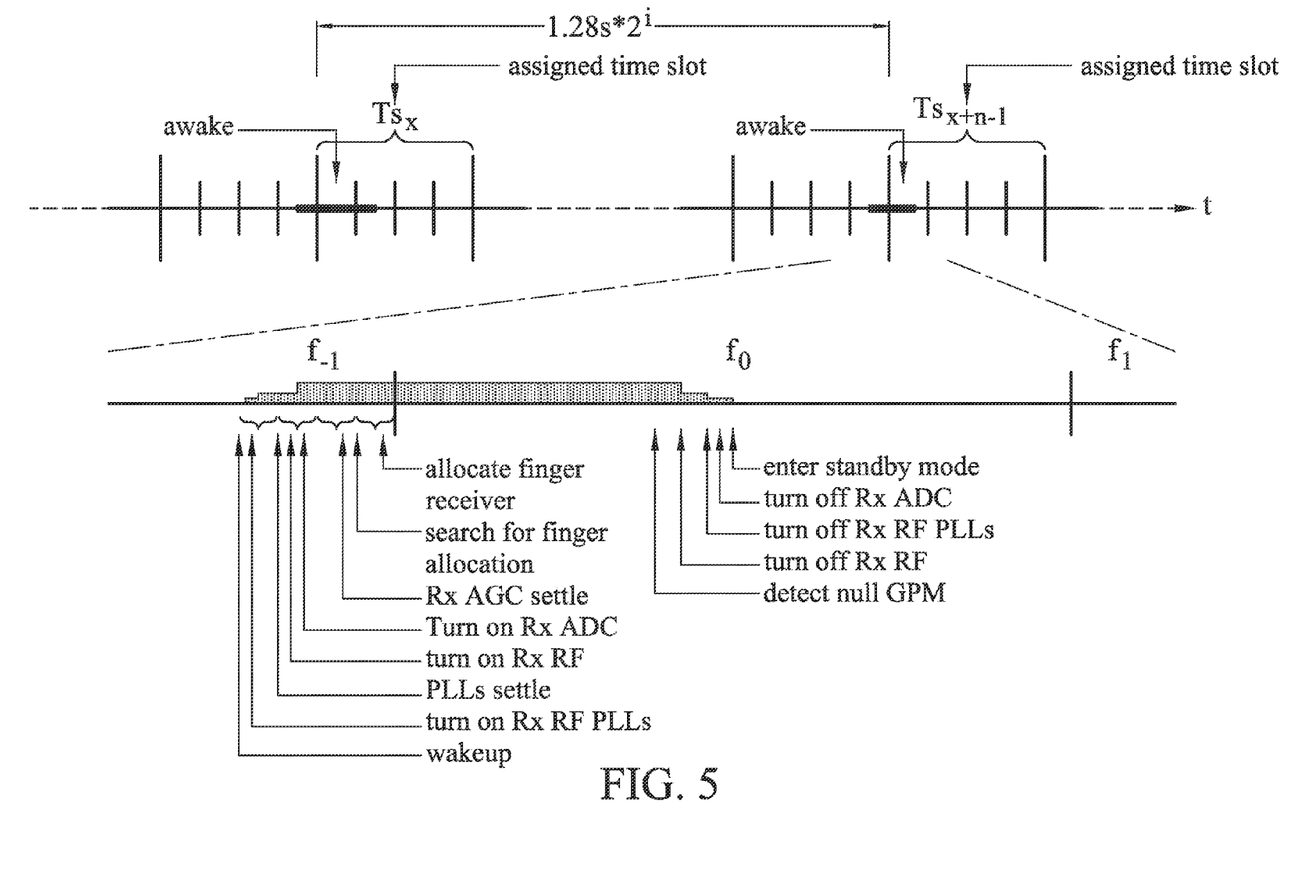
FIG. 5 is a timing chart illustrating a null GPM detection according to an embodiment of the invention.

FIG. 5 is a timing chart illustrating a null GPM detection according to an embodiment of the invention. In this embodiment, the paging operation is performed in the slotted mode and the mobile communication device 310 is assigned with the time slots $Ts_x$ and $Ts_{x+n-1}$. In the time slot $Ts_{x+n-1}$, the mobile communication device 310 turns on the modules for the Rx operations in advance before the end of the last frame of the time slot $Ts_{x+n-2}$, to ensure that the modules for the Rx operations may function in the assigned time slot $Ts_{x+n-1}$. To further clarify, after leaving the standby mode, the mobile communication device 310 first turns on the Rx RF PLLs, and then turns on the Rx RF and Rx ADC when the Rx RF PLLs is settled. Next, the mobile communication device 310 searches for finger allocation when the AGC of the Rx ADC is settled, and allocates finger(s) receiver before the time slot $Ts_{x+n-1}$ for receiving a paging message in the time slot $Ts_{x+n-1}$. Specifically, the searching for finger allocation may refer to searching for signals from the service network 320 and/or processing the searched signal samples. In the time slot $Ts_{x+n-1}$, the mobile communication device 310 receives a predetermined number of symbols in the first frame $f_0$. Assuming the predetermined number is N, then N symbols out of the total 384 symbols (N<384) in the first frame $f_0$ are received, and accordingly, the mobile communication device 310 may compare the received symbols with the known symbols of a null GPM. If the comparison matches, it may be determined that the first frame $f_0$ carries a null GPM which means that the service network 320 does not page the mobile communication device 310 in the time slot $Ts_{x+n-1}$. Thus, the mobile communication device 310 may stop monitoring the paging channel earlier. That is, before the end of the time slot $Ts_{x+n-1}$, the mobile communication device 310 turns off the Rx RF, Rx RF PLLs, Rx ADC, and de-allocates finger(s) and turns off other digital baseband components, in sequence, and then enters the standby mode to save power. In other embodiments, the modules for Rx operations may be turned off in alternative orders, e.g., the Rx ADC may be turned off before or after the Rx RF or Rx RF PLLs is turned off, and the finger(s) receiver may be deallocated before or after the Rx ADC is turned off.

Note that, in order to guarantee the correctness of the comparison of the received symbols with the known symbols, the predetermined number N may be configured to be greater than a threshold value. To be more specific, before the comparison, the known symbols of a null GPM is encoded and stored in a storage unit (now shown), and the mobile communication device 310 de-spreads the received N symbols to obtain the hard decisions of the N symbols. Explicitly, the mobile communication device 310 compares the hard decisions with the known symbols in the storage unit. However, in some circumstances, the mobile communication device 310 may not perform the null GPM detection as described above. For example, if the mobile communication device 310 is in an area with bad reception, the comparison step in the null GPM detection may not be accurate; or the mobile communication device 310 may already know that the service network 320 does not transmit a null GPM in the first frame of a time slot; or the mobile communication device 310 may already know, via the quick paging channel, the random access procedure, or according to some other information, that the service network 320 is transmitting some useful information instead of a null GPM in the first frame of a time slot. Alternatively, it may be determined that a certain portion of some non-null GPMs, after being encoded, may equal to the known symbols in the storage unit.

Figure 6:
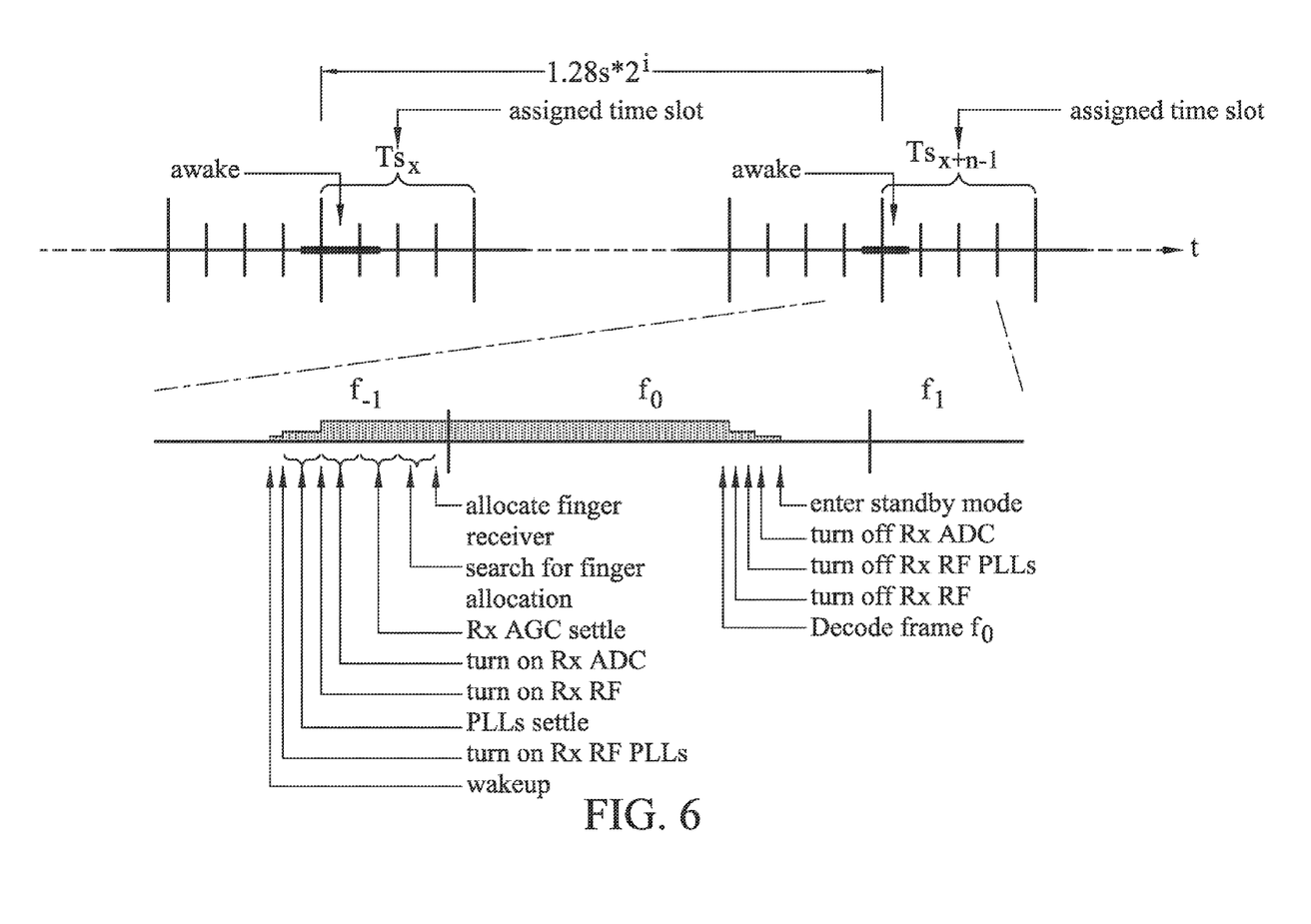
FIG. 6 is a timing chart illustrating the early decoding and termination mechanism according to an embodiment of the invention.

In addition to the null GPM detection mechanism, the invention also proposes an early decoding and termination mechanism for a mobile station to determine whether it is paged by a service network, and if so, the mobile station may stop monitoring the paging channel in less than the period of time of a frame and enter the standby mode. That is, the RF PLL, RF, Rx ADC, fingers may be turned off before the end of the frame to save power. Particularly, a GPM is processed by a special encoding procedure to increase the number of symbols therein, so that signal loss occurring during the transmission via the air interface may be mitigated. In addition, the base station of the service network may use a transmission power to transmit the GPM, which is high enough to ensure that the GPM may be successfully received by the mobile station. For the mobile station, a high transmission power used for transmitting the GPM implies that the Carrier to Interference Ratio (CIR) of the paging channel is high, and this is the feature utilized by the early decoding and termination mechanism, wherein a decoding process may be performed by the mobile station for a predetermined number of symbols received in a frame, and if the decoding process is successful, the mobile station may stop monitoring the paging channel in this frame to save the power consumed by the modules for the Rx operations. If a GPM is detected based on the successful decode result and the MS detects it is not paged, it may stop monitoring the paging channel to save power. If a GPM is not detected based on the successful decode result, the early termination method could be used in the next frame to try to detect the GPM. Power is also saved since PLL, RF, ADC and fingers are kept off in part of each frame. FIG. 6 is a timing chart illustrating the early decoding and termination mechanism according to an embodiment of the invention. In this embodiment, the paging operation is performed in the slotted mode, and the mobile communication device 310 is assigned with the time slots $Ts_x$ and $Ts_{x+n-1}$.

Thus, it has to turn on the modules for the Rx operations, including the Rx RF PLLs, Rx RF, and Rx ADC, in advance, before the end of the last frames of the assigned time slots, to ensure that the modules for the Rx operations may function in the assigned time slots. In the time slot $Ts_{x+n-1}$, the mobile communication device 310 receives a first predetermined number of symbols in the first frame $f_0$. Assuming the first predetermined number to be $M_1$, then the $M_1$ symbols out of the total 384 symbols ($M_1$<384) in the first frame $f_0$ are received, and accordingly, the mobile communication device 310 performs a decoding process of the $M_1$ symbols. If the decoding process is successful, the mobile communication device 310 determines whether it is paged by the service network 320 in the time slot $Ts_{x+n-1}$ according to the GPM retrieved from the decoding process or other information. If the service network 320 does not page the mobile communication device 310 in the time slot $Ts_{x+n-1}$, then the mobile communication device 310 may stop monitoring the paging channel earlier, before the end of the first frame $f_0$. That is, the Rx RF, Rx RF PLLs, Rx ADC, and digital baseband (or finger(s) receiver) may be turned off in sequence before the entire first frame $f_0$ is received.

In another embodiment, if the decoding process fails, the mobile communication device 310 may keep receiving subsequent symbols in the first frame $f_0$ until a second predetermined number of symbols in the first frame $f_0$ are received, wherein the second predetermined number of symbols includes the first predetermined number of symbols. Assuming the second predetermined number to be $M_2$ ($M_1$<$M_2$<384), then the mobile communication device 310 performs the decoding process of the $M_2$ symbols. If the decoding process is successful and a GPM message is detected, the mobile communication device 310 determines whether it is paged by service network 320 in the time slot Ts x+n−1 according to the GPM retrieved from the decoding process. If not paged, stop monitoring the paging channel in this slot and enter into sleep mode. If the decoding process is successful but a GPM message is not detected, the MS will not enter the standby mode and switch on the RF PLL, RF, ADC, and allocate fingers before the next frame, and use early termination to decode and try to detect GPM in the next frame. Otherwise, if the decoding process still fails, the step of receiving the subsequent symbols as described above may be repeated, until the decoding process is successful or all of the 384 symbols in the first frame $f_0$ are received. Specifically, the first and second predetermined numbers $M_1$ and $M_2$ may be configurable, and whether the decoding processes are successful may be determined using the CRC, Viterbi decoding metric, or other decoding metric. In other embodiments, the modules for Rx operations may be turned off in alternative orders, i.e., the turning off of the Rx ADC, Rx RF, and Rx RF PLLs may be performed in any order, or the modules for Rx operations may be turned off before the decoding process and turned on again if the decoding process fails.

Note that, in some circumstances, a mobile station may not perform the early decoding and termination mechanism. For example, if the mobile station is in an area with bad reception (i.e., the CIR, Signal to Noise Ratio (SNR), or Energy per transmitted symbol (Es) of the paging channel is less than a threshold, or the Message Error Rate (MER) of the paging channel is greater than another threshold), the efficiency of the decoding processes may be affected.

A mobile station may apply one of the null GPM detection mechanism and the early decoding and termination mechanism in a paging operation, or may apply both of the null GPM detection mechanism and the early decoding and termination mechanism may be applied in the paging operation.

Figure 7:
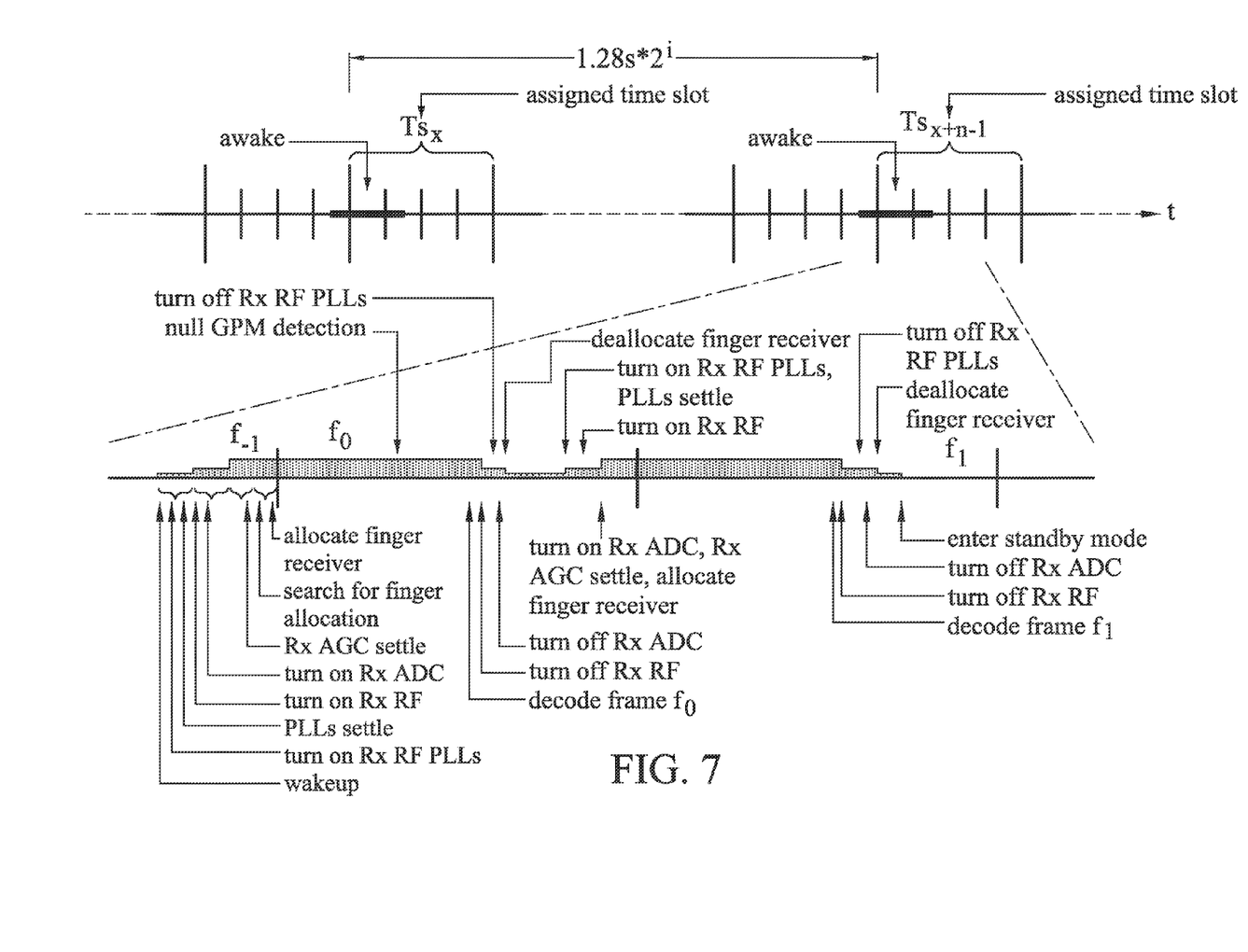
FIG. 7 is a timing chart illustrating a paging operation using both of the null GPM detection mechanism and the early decoding and termination mechanism according to an embodiment of the invention.

FIG. 7 is a timing chart illustrating a paging operation using both of the null GPM detection mechanism and the early decoding and termination mechanism according to an embodiment of the invention. In this embodiment, the paging operation is performed in the slotted mode, and the mobile communication device 310 is assigned with the time slots $Ts_x$ and $Ts_{x+n-1}$, so it has to turn on the modules for the Rx operations, including the Rx RF PLLs, Rx RF, and Rx ADC, in advance before the end of the last frames of the assigned time slots, to ensure that the modules for the Rx operations may function in the assigned time slots. In the time slot $Ts_{x+n-1}$, the mobile communication device 310 receives a first predetermined number of symbols in the first frame $f_0$, and the null GPM detection mechanism is applied first. Assuming the first predetermined number to be N, then N symbols out of the total 384 symbols (N<384) in the first frame $f_0$ are received, accordingly, the mobile communication device 310 may compare the received symbols with the known symbols of a null GPM. If the comparison does not match, the early decoding and termination mechanism is applied and the mobile communication device 310 keeps receiving the subsequent symbols in the first frame $f_0$ until a second predetermined number of symbols in the first frame $f_0$ are received, wherein the second predetermined number of symbols includes the first predetermined number of symbols. Assuming the second predetermined number to be M (N<M<384), then the mobile communication device 310 performs the decoding process of the M symbols, and according to the successful result of the decoding process, the mobile communication device 310 determines that it doesn't detect a complete GPM but it needs to receive the next frame. Thus, the mobile communication device 310 temporarily turns off the Rx RF, Rx RF PLLs, and Rx ADC, and deallocates the finger(s) receiver, and does not enter the standby mode. Subsequently, the mobile communication device 310 turns on the Rx RF PLLs, Rx RF, and Rx ADC, and allocates finger(s) receiver before the next frame. In the second frame $f_1$, the early decoding and termination mechanism is applied again, and the mobile communication device 310 receives the second predetermined number of symbols in the second frame $f_1$. Assuming the second predetermined number to be M (M<384), then the mobile communication device 310 performs the decoding process of the M symbols. According to the successful result of the decoding process, the mobile communication device 310 determines that a GPM message is received and it has not been paged in the time slot $Ts_{x+n-1}$, so it turns off the Rx RF, Rx RF PLLs, Rx ADC, and deallocates the finger(s) receiver, and then enters the standby mode.

Figure 8:
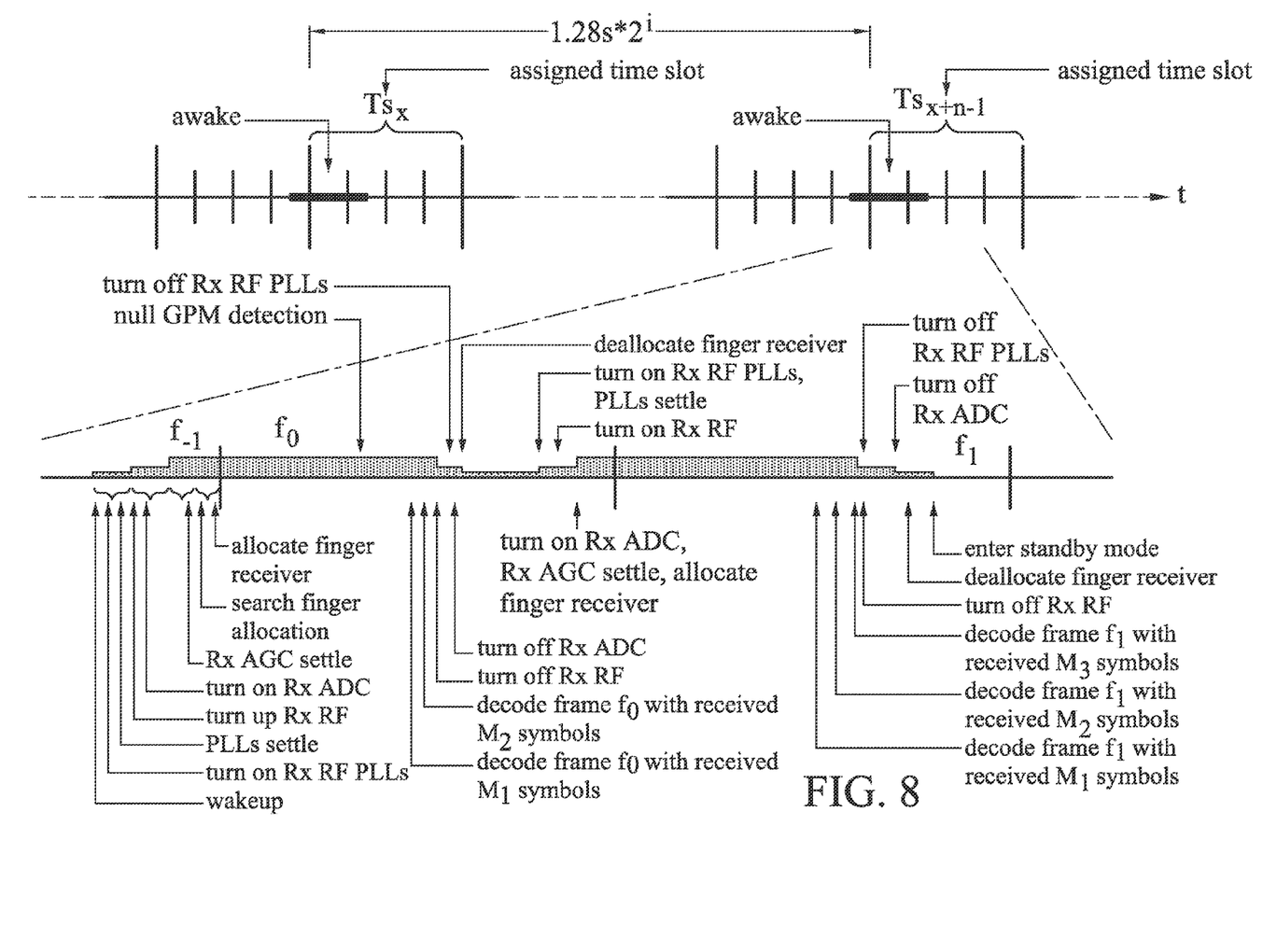
FIG. 8 is a timing chart illustrating a paging operation using both of the null GPM detection mechanism and the early decoding and termination mechanism according to another embodiment of the invention.

FIG. 8 is a timing chart illustrating a paging operation using both of the null GPM detection mechanism and the early decoding and termination mechanism according to another embodiment of the invention. In this embodiment, the paging operation is performed in the slotted mode, and the mobile communication device 310 is assigned with the time slots $Ts_x$ and $Ts_{x+n-1}$, so it has to turn on the modules for the Rx operations, including the Rx RF PLLs, Rx RF, and Rx ADC, in advance before the end of the last frames of the assigned time slots, to ensure that the modules for the Rx operations may function in the assigned time slots. In the time slot $Ts_{x+n-1}$, the mobile communication device 310 receives a first predetermined number of symbols in the first frame $f_0$, and the null GPM detection mechanism is applied first. Assuming the first predetermined number to be N, then N symbols out of the total 384 symbols (N<384) in the first frame $f_0$ are received, and accordingly, the mobile communication device 310 may compare the received symbols with the known symbols of a null GPM. If the comparison does not match, the early decoding and termination mechanism is applied and the mobile communication device 310 keeps receiving the subsequent symbols in the first frame $f_0$ until a second predetermined number of symbols in the first frame $f_0$ are received, wherein the second predetermined number of symbols includes the first predetermined number of symbols. Assuming the second predetermined number to be $M_1$ (N<$M_1$<384), then the mobile communication device 310 performs the decoding process of the $M_1$ symbols, and according to the failure of the decoding process, the mobile communication device 310 keeps receiving the subsequent symbols in the first frame $f_0$ until a third predetermined number of symbols in the first frame $f_0$ are received, wherein the third predetermined number of symbols includes the second predetermined number of symbols. Assuming the third predetermined number to be $M_2$ ($M_1$<$M_2$<384), then the mobile communication device 310 performs the decoding process of the $M_2$ symbols, and according to the successful result of the decoding process, the mobile communication device 310 detects a GPM and determines that it has not been paged in the first frame $f_0$ but it needs to receive the next frame. Thus, the mobile communication device 310 temporarily turns off the Rx RF, Rx RF PLLs, and Rx ADC, and deallocates the finger(s) receiver, and does not enter the standby mode. Subsequently, the mobile communication device 310 turns on the Rx RF PLLs, Rx RF, and Rx ADC, and allocates finger(s) receiver before the next frame. In the second frame $f_1$, the early decoding and termination mechanism is applied again, and the mobile communication device 310 receives the second predetermined number of symbols in the second frame $f_1$. Assuming the second predetermined number to be $M_1$ ($M_1$<384), then the mobile communication device 310 performs the decoding process of the $M_1$ symbols. In response to the failure of the decoding process, the mobile communication device 310 keeps receiving the subsequent symbols in the second frame $f_1$ until the third predetermined number, i.e., $M_2$ ($M_1$<$M_2$<384), of symbols in the second frame are $f_1$ received, and performs the decoding process of the $M_2$ symbols. For failure of the decoding process of the $M_2$ symbols, the mobile communication device 310 keeps the receiving of subsequent symbols in the second frame $f_1$ until a fourth predetermined number of symbols in the second frame $f_1$ has been received, wherein the fourth predetermined number of symbols includes the third predetermined number of symbols. Assuming the fourth predetermined number to be $M_3$ ($M_1$<$M_2$<$M_3$<384), then the mobile communication device 310 performs the decoding process of the $M_3$ symbols, and according to the successful result of the decoding process, the mobile communication device 310 determines that it has not been paged in the time slot $Ts_{x+n-1}$, so it turns off the Rx RF, Rx RF PLLs, Rx ADC, and deallocates the finger(s) receiver, and then enters the standby mode.

Note that in the embodiments of FIGS. 7 and 8, the modules for Rx operations may be turned off in alternative orders, i.e., the turning off of the Rx ADC, Rx RF, and Rx RF PLLs may be performed in any order.

Figure 9:
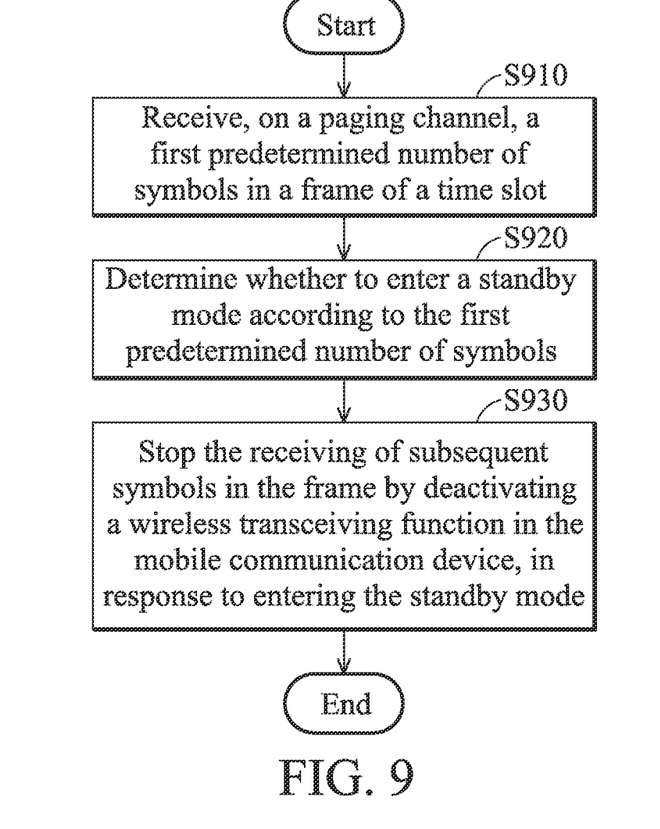
FIG. 9 is a flow chart illustrating a power saving method for a paging operation according to an embodiment of the invention.

FIG. 9 is a flow chart illustrating a power saving method for a paging operation according to an embodiment of the invention. The power saving method may be applied in a mobile station, such as the mobile communication device 310, for saving the power consumption in a paging operation. To begin, the mobile station receives, on a paging channel, a first predetermined number of symbols in a frame of a time slot, after turning on the modules for Rx operations, including the Rx RF PLLs, Rx RF, and Rx ADC (step S910). Subsequently, the mobile station determines whether to enter a standby mode according to the first predetermined number of symbols (step S920). If the mobile station determines to enter the standby mode, it stops the receiving of subsequent symbols in the frame by deactivating the wireless transceiving function therein (step S930). In step S920, the mobile station may apply the null GPM detection mechanism or the early decoding and termination mechanism for determining whether to enter the standby mode. If the null GPM detection mechanism is applied, the mobile station may compare the first predetermined number of symbols with the known symbols of a null GPM, and enters the standby mode if the comparison matches. Specifically, the null GPM is encoded and stored in a storage unit of the mobile station, and the first predetermined number of symbols is de-spread before the comparison. If the early decoding and termination mechanism is applied, the mobile station may perform a decoding process of the first predetermined number of symbols, and then determines whether to enter the standby mode according to the result of the decoding process. Specifically, the mobile station may enter the standby mode if a page message is detected based on the successful result of the decoding process and the MS determines it is not paged. Otherwise, if the decoding process fails, the mobile station may keep receiving the subsequent symbols in the frame until a second predetermined number of symbols in the frame are received, wherein the second predetermined number of symbols includes the first predetermined number of symbols. Particularly, the frame may be generated from the decoding process of the second predetermined number of symbols, if early termination is adopted, more than one frame might be received to detect the page message. Note that, before the step S920, the mobile station may first determine a channel quality indicator of the paging channel, and the null GPM detection mechanism or the early decoding and termination mechanism may only be applied when the channel quality indicator meets a certain threshold. The channel quality indicator may be the MER, CIR, SNR, or Es of the paging channel.

While the invention has been described by way of example and in terms of preferred embodiment, it is to be understood that the invention is not limited thereto. Those who are skilled in this technology can still make various alterations and modifications without departing from the scope and spirit of this invention. For example, the mobile communication device 310 and the service network 320 may use other wireless technologies, such as the Interim Standard 95 (IS-95) technology, the CDMA 2000 technology, the CDMA 2000 1x technology, the CDMA 2000 Evolution Data Optimized (EV-DO) technology (including the release 0, release A, and release B), or any evolutionary technology of the CDMA 2000 technology family. Therefore, the scope of the present invention shall be defined and protected by the following claims and their equivalents.

What is claimed is:

1. A mobile communication device, comprising:
 a wireless device performing wireless transceiving to and from a service network; and
 a controller device receiving, on a paging channel, a first part of a plurality of symbols in a frame of a time slot via the wireless device, determining to enter a standby mode in response to the first part of the symbols being equal to the same amount of symbols which comprise only a fraction of a null General Paging Message (GPM), receiving subsequent symbols in the frame in response to the first part of the symbols not being equal to the same amount of symbols which comprise only the fraction of the null GPM, and stopping the receiving of subsequent symbols in the frame by deactivating the wireless device in response to entering the standby mode,
 wherein the first part of the symbols comprises only a fraction of the frame, and
 wherein the controller device further enters the standby mode in response to successfully generating the frame right after decoding the first part of the symbols, and receives a second part of the symbols subsequent to the first part of the symbols in the frame in response to not successfully generating the frame right after decoding the first part of the symbols, wherein decoding the second part of the symbols successfully generates the frame, and wherein the second part of the symbols comprises only another fraction of the frame.

2. The mobile communication device of claim 1, wherein the frame is a first frame of the time slot.

3. The mobile communication device of claim 1, wherein the controller module further encodes the null GPM and de-modulating the first part of the symbols, prior to comparing the first part of the symbols with the null GPM.

4. The mobile communication device of claim 1, wherein the controller module further determines a channel quality indicator of the paging channel, and the determining of whether to enter the standby mode is only performed in response to the channel quality indicator meeting a threshold value.

5. The mobile communication device of claim 4, wherein the channel quality indicator comprises at least one of the following:
 a Message Error Rate (MER);
 a Carrier to Interference Ratio (CIR);
 a Signal to Noise Ratio (SNR); and
 an Energy per transmitted symbol (Es).

6. A power saving method for paging operations in a mobile communication device, comprising:
 receiving, on a paging channel, a first part of a plurality of symbols in a frame of a time slot, wherein the first part of the symbols comprises only a fraction of the frame;
 determining to enter a standby mode in response to the first part of the symbols being equal to the same amount of symbols which comprise only a fraction of a null General Paging Message (GPM);
 receiving subsequent symbols in the frame in response to the first part of the symbols not being equal to the same amount of symbols which comprise only the fraction of the null GPM;
 stopping the receiving of subsequent symbols in the frame by deactivating a wireless transceiving function in the mobile communication device, in response to entering the standby mode;
 entering the standby mode, in response to successfully generating the frame right after decoding the first part of the symbols; and
 receiving a second part of the symbols subsequent to the first part of the symbols in the frame, in response to not successfully generating the frame right after decoding the first part of the symbols, wherein the second part of the symbols comprises only another fraction of the frame;
 wherein decoding the second part of the symbols successfully generates the frame.

7. The power saving method of claim 6, wherein the frame is a first frame of the time slot.

8. The power saving method of claim 6, further comprising: encoding the null GPM and de-modulating the first part of the symbols, prior to comparing the first part of the symbols with the null GPM.

9. The power saving method of claim 6, further comprising determining a channel quality indicator of the paging channel, wherein the determining of whether to enter the standby mode is only performed in response to the channel quality indicator meeting a threshold value.

10. The power saving method of claim 9, wherein the channel quality indicator comprises at least one of the following:
- a Message Error Rate (MER);
- a Carrier to Interference Ratio (CIR);
- a Signal to Noise Ratio (SNR); and
- an Energy per transmitted symbol (Es).

11. A mobile communication system, comprising:
- a service network, operating in a slotted mode; and
- a mobile communication device receiving, from the service network, a first part of a plurality of symbols in a frame of a time slot on a paging channel, determining to enter a standby mode in response to the first part of the symbols being equal to the same amount of symbols which comprise only a fraction of a null General Paging Message (GPM), receiving subsequent symbols in the frame in response to the first part of the symbols not being equal to the same amount of symbols which comprise only the fraction of the null GPM, and stopping the receiving of subsequent symbols in the frame in response to entering the standby mode,
- wherein the first part of the symbols comprises only a fraction of the frame, and
- wherein the mobile communication device further enters the standby mode in response to successfully generating the frame right after decoding the first part of the symbols, and receives a second part of the symbols subsequent to the first part of the symbols in the frame in response to not successfully generating the frame right after decoding the first part of the symbols, wherein decoding the second part of the symbols successfully generates the frame, and wherein the second part of the symbols comprises only another fraction of the frame.

12. The mobile communication system of claim 11, wherein the frame is a first frame of the time slot.

13. The mobile communication system of claim 11, wherein the mobile communication device further encodes the null GPM and de-modulating the first part of the symbols, prior to comparing the first part of the symbols with the null GPM.

14. The mobile communication system of claim 11, wherein the mobile communication device further determines a channel quality indicator of the paging channel, and the determining of whether to enter the standby mode is only performed in response to the channel quality indicator meeting a threshold value.

15. The mobile communication system of claim 14, wherein the channel quality indicator comprises at least one of the following:
- a Message Error Rate (MER);
- a Carrier to Interference Ratio (CIR);
- a Signal to Noise Ratio (SNR); and
- an Energy per transmitted symbol (Es).

* * * * *